(12) United States Patent
Amira et al.

(10) Patent No.: US 9,143,742 B1
(45) Date of Patent: Sep. 22, 2015

(54) AUTOMATED AGGREGATION OF RELATED MEDIA CONTENT

(75) Inventors: Rony Amira, Rishon Lezion (IL); Tal Yadid, Ramat Hasharon (IL); Asaf Zomet, Jerusalem (IL); Shlomo Reuben Urbach, Rehovot (IL); Eldad Barkai, Givat-Shmuel (IL)

(73) Assignee: Google Inc., Mountain View, CA (US)

( * ) Notice: Subject to any disclaimer, the term of this patent is extended or adjusted under 35 U.S.C. 154(b) by 68 days.

(21) Appl. No.: 13/361,766

(22) Filed: Jan. 30, 2012

(51) Int. Cl.
*H04N 7/18* (2006.01)

(52) U.S. Cl.
CPC ............. *H04N 7/181* (2013.01); *H04N 7/183* (2013.01)

(58) Field of Classification Search
CPC .......... H04N 7/181; H04N 7/183; H04N 7/18
USPC .................. 375/240.01–240.29; 348/142–160
See application file for complete search history.

(56) References Cited

U.S. PATENT DOCUMENTS

| | | | |
|---|---|---|---|
| 5,655,058 A | 8/1997 | Balasubramanian et al. | |
| 7,203,635 B2 | 4/2007 | Oliver et al. | |
| 7,433,329 B2 | 10/2008 | Qian | |
| 7,460,730 B2 | 12/2008 | Pal et al. | |
| 7,489,688 B2 | 2/2009 | Giesberts et al. | |
| 7,583,288 B2 | 9/2009 | Uyttendaele et al. | |
| 7,707,246 B1 | 4/2010 | Issa et al. | |
| 7,752,265 B2 | 7/2010 | Svendsen et al. | |
| 7,978,931 B2 | 7/2011 | Pan et al. | |
| 7,991,770 B2 * | 8/2011 | Covell et al. | 707/722 |
| 8,108,460 B2 | 1/2012 | Polis et al. | |
| 8,122,080 B2 | 2/2012 | Polis et al. | |
| 2002/0075322 A1 | 6/2002 | Rosenzweig et al. | |
| 2005/0008240 A1 | 1/2005 | Banerji et al. | |
| 2006/0059120 A1 | 3/2006 | Xiong et al. | |
| 2007/0100829 A1 | 5/2007 | Allen et al. | |
| 2008/0077262 A1 | 3/2008 | Davis et al. | |
| 2008/0184058 A1 | 7/2008 | McDermott et al. | |
| 2008/0244373 A1 | 10/2008 | Morris et al. | |
| 2009/0089352 A1 | 4/2009 | Davis et al. | |
| 2009/0148124 A1 | 6/2009 | Athsani et al. | |
| 2009/0187588 A1 | 7/2009 | Thambiratnam et al. | |
| 2009/0271283 A1 | 10/2009 | Fosnacht et al. | |
| 2010/0017716 A1 | 1/2010 | Weda et al. | |
| 2010/0077289 A1 | 3/2010 | Das et al. | |
| 2010/0082688 A1 | 4/2010 | Davis et al. | |
| 2010/0119053 A1 | 5/2010 | Goeldi | |
| 2010/0158315 A1 | 6/2010 | Martin | |

(Continued)

OTHER PUBLICATIONS

Office Action Dated Jun. 1, 2012 for U.S. Appl. No. 13/370,036; 67 pages.

(Continued)

*Primary Examiner* — Andy Rao
(74) *Attorney, Agent, or Firm* — Amin, Turocy & Watson, LLP

(57) ABSTRACT

Systems and methods for media aggregation are disclosed herein. The system includes a media system that can transform user generated media items into at least one aggregated media item. A synchronization component can synchronize media items with respect to time. Synchronized media items can be analyzed and transformed into an aggregated media item for storage and/or display. In addition, the aggregated media item is capable of being manipulated to create an enhanced and customizable viewing and/or listening experience. Accordingly, media item aggregation can be accomplished.

20 Claims, 11 Drawing Sheets

(56) References Cited

U.S. PATENT DOCUMENTS

| | | |
|---|---|---|
| 2010/0179915 A1 | 7/2010 | Nastacio |
| 2010/0183280 A1 | 7/2010 | Beauregard et al. |
| 2010/0225811 A1 | 9/2010 | Konvisser |
| 2011/0040760 A1 | 2/2011 | Fleischman et al. |
| 2011/0060998 A1 | 3/2011 | Schwartz et al. |
| 2011/0093466 A1 | 4/2011 | Kim et al. |
| 2011/0153602 A1 | 6/2011 | Kiddle et al. |
| 2011/0161423 A1 | 6/2011 | Pratt et al. |
| 2011/0258556 A1 | 10/2011 | Kiciman et al. |
| 2011/0301447 A1 | 12/2011 | Park et al. |
| 2012/0039513 A1 | 2/2012 | Kennedy et al. |
| 2012/0059826 A1 | 3/2012 | Mate et al. |
| 2012/0077522 A1 | 3/2012 | Mate et al. |
| 2012/0131683 A1 | 5/2012 | Nassar et al. |
| 2012/0144978 A1 | 6/2012 | Wilder et al. |
| 2012/0265843 A1 | 10/2012 | Nadler et al. |
| 2012/0300974 A1 | 11/2012 | Rodriguez |
| 2013/0130729 A1 | 5/2013 | Cok et al. |

OTHER PUBLICATIONS

Office action for U.S. Appl. No. 13/370,036, dated Nov. 6, 2012, 52 pages.
Office Action Dated Jul. 6, 2012 for U.S. Appl. No. 13/361,776; 66 pages.
Office Action dated Dec. 11, 2012 for U.S. Appl. No. 13/361,776, 46 pages.
Huang et al., "Joint Scene Classification and Segmentation Based on Hidden Markov Model," (IEEE Transactions On Multimedia, vol. 7, No. 3, Jun. 2005).
Divakaran et al. (Video Mining Using Combinations of Unsupervised and Supervised Learning Techniques, MERL, Mar. 2004).
Office Action for U.S. Appl. No. 13/361,776, dated Mar. 13, 2013, 52 pages.
Office Action for U.S. Appl. No. 13/370,036, dated Mar. 21, 2013, 45 pages.
Office Action for U.S. Appl. No. 13/370,036, dated Jul. 1, 2013, 46 pages.
Office Action for U.S. Appl. No. 13/361,776, dated Sep. 10, 2013, 55 pages.
Notice of Allowance for U.S. Appl. No. 13/370,036, dated Sep. 20, 2013, 41 pages.
Notice of Allowance for U.S. Appl. No. 13/361,776, dated Nov. 27, 2013, 37 pages.

* cited by examiner

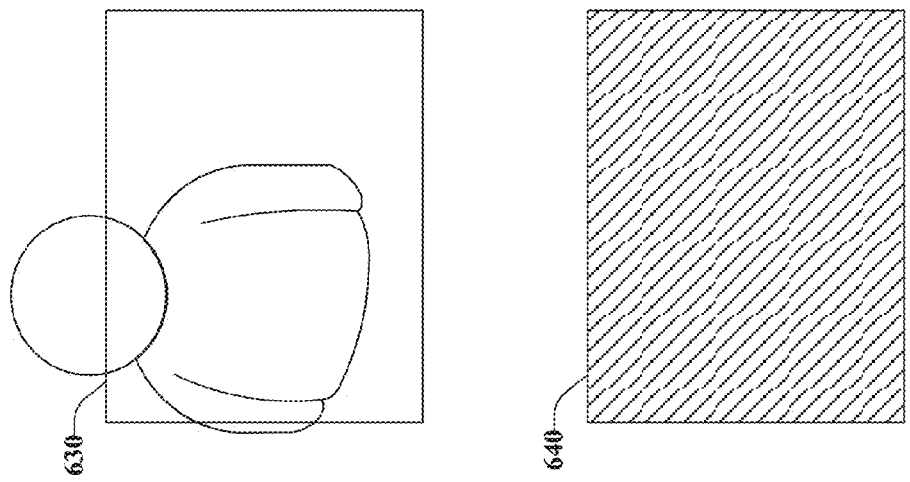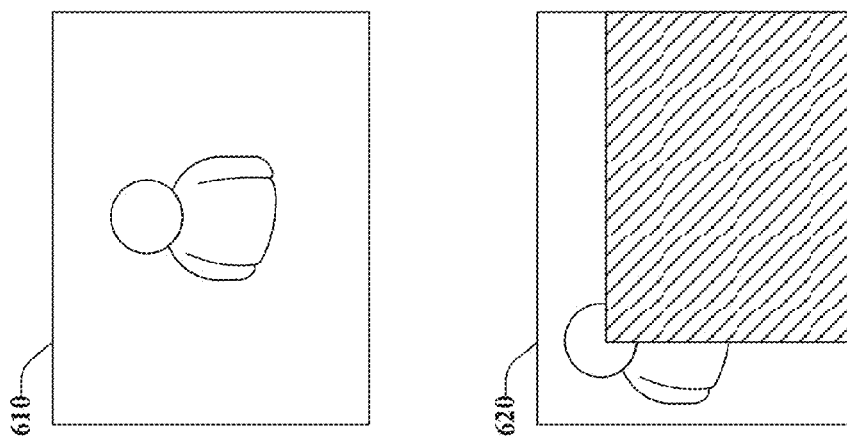

AUTOMATED AGGREGATION OF RELATED MEDIA CONTENT

This disclosure relates to aggregation of related media content, and more particularly to controllable aggregation of a plurality of users' respective media content for a particular event.

BACKGROUND

The proliferation, advancement, and affordability of image capturing devices such as smart phones, digital cameras, and other electronic devices has made media capturing easier and more available to the general public than ever before. Sharing of videos captured by individuals attending a particular sporting event, wedding, music concert or birthday party, etc. by way of a social media website has become commonplace. Videos of a same event are often uploaded by disparate people that attended the event. For example, querying an existing media sharing website for a video of an event, such as "$5^{th}$ grade concert New York," can result in dozens if not hundreds of video files of that event. Respective videos of a common event are often recorded at different angles of view, different distance from the target of the video, different locations with respect to acoustic and/or lighting quality, different device capabilities (e.g., image capture quality, encoding, audio sensors, processing capabilities, etc.), and other differing aspects that manifest in the recorded video.

SUMMARY

The following presents a simplified summary of the specification in order to provide a basic understanding of some aspects of the specification. This summary is not an extensive overview of the specification. It is intended to neither identify key or critical elements of the specification nor delineate the scope of any particular implementations of the specification, or any scope of the claims. Its purpose is to present some concepts of the specification in a simplified form as a prelude to the more detailed description that is presented in this disclosure.

In an implementation, an identification component receives a media item from a user and associates the media item with media items of the same event. The media item can be associated automatically or via user input. A synchronization component automatically synchronizes the media items (e.g., synchronization based on a time correlation). Optionally, an analyzer component can be employed to automatically analyze and rank the media items or a plurality of intervals (e.g., a frame, or group of frames) of the media items, based on at least one criterion, e.g., video quality. One or more intervals can form a segment. In another example, an editing component can be employed to receive user input and apply user input to customize analysis. An aggregation component then aggregates the automatically synchronized and ranked segments of media items for aggregated playback.

In another example, a set of video files is associated based on common content. The video files are then automatically synchronized based on time and analyzed and ranked based on video quality, audio quality, video characteristics (e.g., color, light, and/or motion), audio characteristics (e.g., audio levels, noise, and/or pitch), composition and/or user preference (e.g., a plurality of intervals are ranked). In one example, the media files are analyzed frame by frame, ranked and then grouped into segments. The segments are automatically aggregated according to rank by an aggregation component to form a new composite media item. The aggregated files can be viewed by a user and/or a plurality of users. The plurality of users can be granted access according to user access rules. For example, user access rules may be set according to who authored a media item. The aggregated media file can seamlessly change between video files and/or audio files.

The following description and the drawings set forth certain illustrative aspects of the specification. These aspects are indicative, however, of but a few of the various ways in which the principles of the specification may be employed. Other advantages and novel features of the specification will become apparent from the following detailed description of the specification when considered in conjunction with the drawings.

BRIEF DESCRIPTION OF THE DRAWINGS

Numerous aspects, implementations, and advantages of the present invention will be apparent upon consideration of the following detailed description, taken in conjunction with the accompanying drawings, in which like reference characters refer to like parts throughout, and in which:

FIG. 6 illustrates an example diagram of a set of captured media items in accordance with various aspects of this disclosure;

DETAILED DESCRIPTION

Figure 1:
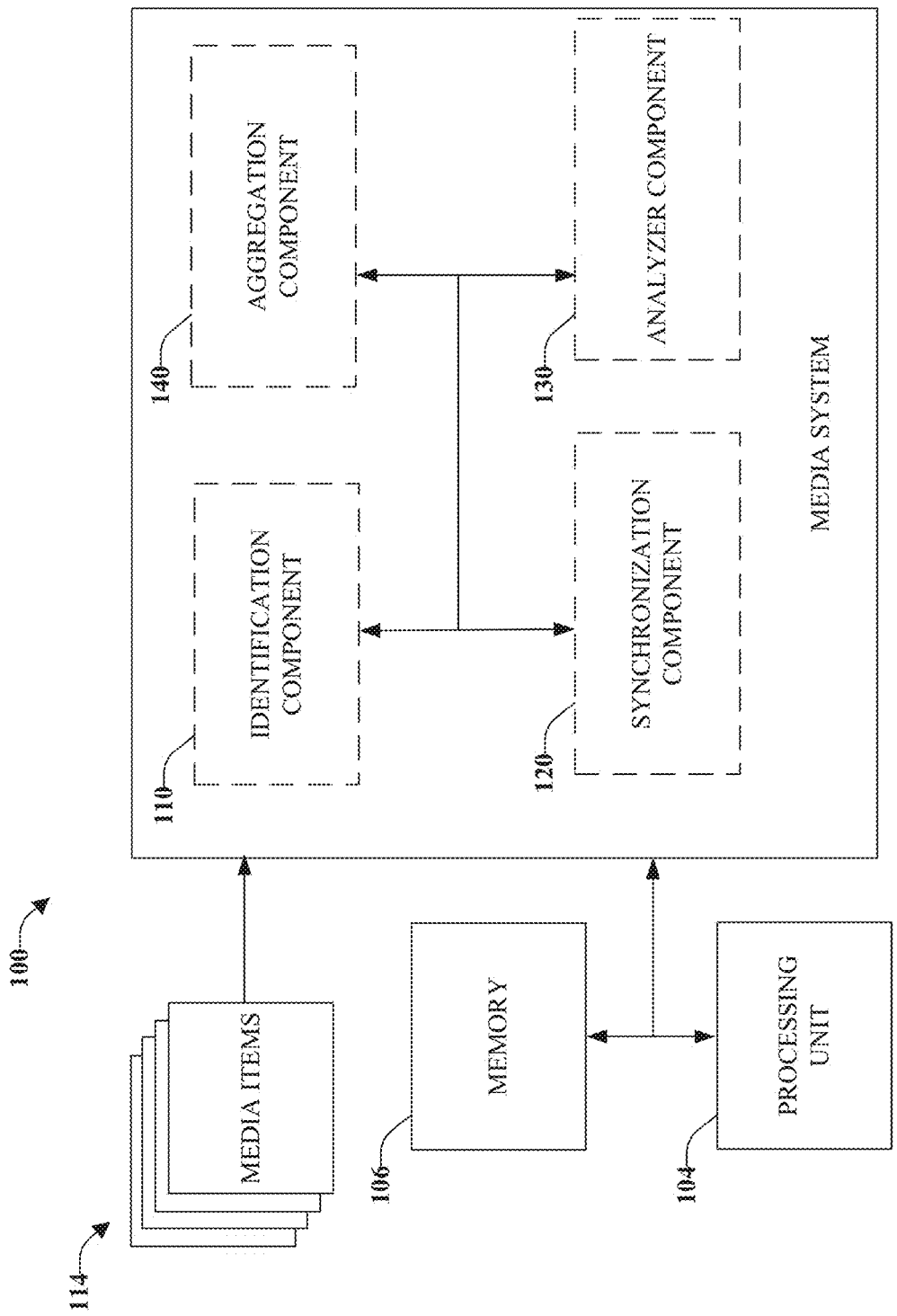
FIG. 1 illustrates a high-level functional block diagram of an example media system in accordance with various aspects of this disclosure.

Various aspects or features of this disclosure are described with reference to the drawings, wherein like reference numerals are used to refer to like elements throughout. In this specification, numerous specific details are set forth in order to provide a thorough understanding of this disclosure. It should be understood, however, that certain aspects of disclosure may be practiced without these specific details, or with other methods, components, materials, etc. In other instances, well-known structures and devices are shown in block diagram form to facilitate describing this disclosure.

Systems and methods disclosed herein relate to aggregation of media items uploaded by a plurality of users. In one implementation, a media system is employed to aggregate a plurality of videos. A plurality of users capture and upload multiple video files of an event such as a wedding, a school play, a children's sporting event, an entertainment event, a party, a school event, and/or other private events, (employing any of a variety of suitable video capture devices, e.g., video cameras, smart phones, tablets, e-readers, personal computers, and smart phones) to a data store (e.g., a server in communication with a computer readable storage medium).

Respective video files are collected by a collaborative environment for publication so that the user and others (e.g., friends, family members and other contacts) can access the video. The video files can be collected in any suitable manner (e.g., directly from a recording device, using a personal computer, smart phone, or tablet) and stored in one or more servers. Each server includes various components stored in a computer readable medium that perform respective functions such as analyzing the videos, acquiring features of the videos (e.g., determining the event that was recorded, a time of recording, an author of video, the type of recording device, a format of the video, a location of the event, individuals within the video, angle of recording, quality of the video, quality of associated audio, lighting, etc.), classifying the videos, associating the videos with similar videos (e.g., videos of the same event), and providing for aggregating subsets of the videos. In one exemplary implementation, a user can opt-out of having particular information collected and/or shared with the server.

In one implementation, a component stored in a server determines that certain videos are related based on, for example, metadata or by analyses of the content of the videos. Metadata can include information related to time of capture, location of capture, and/or tags, for example. In one aspect, time and location information can be provided via a global positioning system (GPS) or communication network access points (e.g., internet connection access points). Time and location information associated with respective videos can determine a relationship between the respective videos. Tags can be associated with each video by users or by automatic tagging techniques. Tagging refers to associating a key word, set of words or phrase with the video, wherein the associated key word(s) or phrases are referred to as a tag(s). For example, a user can tag a captured video with "Christmas concert" "New York" "December, 2011" "$5^{th}$ grade". In one implementation, respective user input can be employed to associate an uploaded video with other video(s) of a common event. In another exemplary non-limiting implementation, an event entity, such as an event page, is defined and videos are associated with the event entity as opposed to directly associated with each other.

In one embodiment, a subset of related videos is subsequently synchronized. The synchronization can be performed according to time, or other suitable synchronization metrics. For example, a time line can be determined through audio recognition, pattern recognition, captured time (e.g., time stamp), a clock, or a combination thereof. The videos can be analyzed in connection with various metrics or criteria (e.g., video quality, audio quality, angle of recording, level of noise, lighting, frequency of appearance of certain people or objects). For example, with respect to a set of videos associated with a particular school concert, a user may wish to focus on a particular child (e.g., the parent's own child) in the concert and input such criteria. In one implementation, a user's input can be stored for later use. Analyses of the set of videos or portions thereof can determine (e.g., using facial recognition) image size and frequency of appearance of the child's face in respective videos of the set. In one implementation, videos (or intervals thereof) within the set are ordered and/or ranked based on one or more desired criterion (e.g., image size, and frequency of appearance of the child). In one aspect, a set of users can access the set of videos (e.g., edit, watch and/or review). The set of users can collaborate to edit the aggregated video and/or create multiple aggregated videos based on the set (and/or a subset of the set) of related videos. The set of users, or a subset thereof, can be granted access to perform actions on the set of media items according to user access rules. For example, user access rules may be defined according to who authored a media item. User access rules can include defining who can view a plurality of media items, edit a plurality of media items, review the plurality of media items, and publish a new media item.

Respective subsets of video segments can be aggregated to generate one or more new media items that emphasize desired aspects of the analyzed videos. The aggregated new media item(s) can display respective videos transformed into single composite video (e.g., stitch video for seamless playback). With reference to the above school concert example, the aggregated new media item can include seamless switching between a plurality of videos as a function of respective rank.

In an implementation, sound associated with each video can be combined or selectively chosen for playback. For example, analysis of audio information can determine highest quality audio associated with respective videos. Then, the selected audio can be played based on rank and/or combined with other audio. Audio of one video can be combined with an image portion of another video. Respective aggregated new media items can contain surround sound qualities through aggregation of multiple audio files.

Media items can be synchronized, analyzed, and aggregated according to audio quality, video quality, audio characteristics (e.g., focusing on bass, treble, amplitude, pitch, dB level, etc.), video features, or the like.

Referring now to FIG. 1, there is illustrated a non-limiting exemplary implementation of a media system 100 that provides media aggregation in accordance with various aspects of this disclosure. The system 100 provides for aggregation of media items that are captured, uploaded and/or viewed by a plurality of users in a collaborative environment. The system 100 receives media item(s) 114 (e.g., audio and or video information) that are respectively captured and uploaded to the system 100 by a set of users. Respective users can capture and upload the media item(s) 114 via any suitable electronic device, such as for example a camera, smart phone, video camera, tablet computer, laptop computer, personal computer and cell phone, via a communication framework (e.g., the Internet or cellular network). The media item(s) 114 can be provided to an identification component 110 at concurrent, overlapping or disparate times. In one example, users upload respective media items years apart.

In FIG. 1, the system 100 includes a computer processing unit 104 capable of executing various components stored in a computer readable memory 106, such as an identification component 110, a synchronization component 120, an analyzer component 130, and an aggregation component 140. Memory 106 can store media item(s) 114. Identification component 110 associates a subset of the media items that pertain to a common event (e.g., a concert, a play, a sporting event, an entertainment event, a party, a school event, and/or other private events). Identification component 110 can identify the common event through extrinsic information or analyses associated with respective media items (e.g., image or audio recognition, metadata comparison, user input (e.g., tagging information), authors, location, time and/or content). In one example, metadata is generated automatically, such as via global positioning system (GPS), or wireless location triangulation. In addition, time and location information can be generated by communication framework access points or routing information. For example, users can upload respective media items via a wireless router in a school auditorium and media identification component 110 can associate the respective media items with that location.

Synchronization component 120 automatically synchronizes associated sets and/or subsets of media items. The associated media items can be synchronized as a function of common characteristics (e.g., sound recognition, motion recognition, pattern recognition, time stamps, etc.). In one aspect, the media information synchronization is performed with respect to time. Synchronization component 120 can identify a common time line by comparing like characteristics in the set and/or subset of media item(s), metadata such as time stamps, or a combination thereof.

In one example, motion and/or pattern recognition identifies common movements of a pattern in a plurality of video files to synchronize a set of media items. Further, synchronization component 120 can match visual features in the media items and find temporal alignment parameters that maximize geometrical constraints such as for example homography matching or Fundamental matrix constraint. In another aspect, each frame of a video can be synchronized by overlapping frames of at least one other video. Alternatively or additionally, key frames can be selected for synchronization. In another example, synchronization can rely at least in part on correlation of media items' respective audio. For example, matching of audio signals can be utilized to create a common time line.

In another example, audio recognition is applied to audio of the respective media items to identify common characteristics. The common characteristics can be used to create a common timeline among the set or subset of media items.

Analyzer component 130 analyzes a set of temporally synchronized media items based on any of a variety of suitable metrics (e.g., video quality, audio quality, presence of a subject in video, composition of video, angle of video and/or audio) that facilitate identifying segments of respective media items with desirable attributes. In one implementation, analyzer component 130 groups media items associated with a common event into one or more subsets of media items. Respective subsets of media items can be grouped based on any of a variety of suitable metrics.

In one non-limiting exemplary implementation, analyzer component 130 partitions respective media items into portions (e.g., frames and/or intervals). An interval can be a number of frames or a time interval (e.g., one second interval). A rank is given to each portion. The portions can be grouped into a set of segments (e.g., ten second segments). In one embodiment, intervals are grouped into segments as a function of rank (e.g., audio quality, video quality, and/or other metric). In one embodiment, analyzer component 130 segments media items based on audio level, e.g., to facilitate latter stitching of media segments during in quiet times of a video. In one embodiment, analyzer component 130 segments media items based on motion magnitude, e.g., to facilitate latter stitching of media segments during less action in a video.

In one example, analyzer component 130 ranks media items and groups the media items into respective subsets based on the rank (e g, ranking and grouping as a function of video quality). Video quality may be evaluated via video quality assessment (VQA) algorithms and techniques. Such techniques can include peak signal to noise ratio (PSNR), structural SIMilatary (SSIM), Multi-scale SSIM (MS-SSIM), Speed SSIM, and/or Visual Signal to Noise Ratio (VSNR).

In another example, analyzer component 130 can determine video quality based on subjective user analysis. In one example, users can associate a quality with a video. The quality may be a level on a subjective scale such as number of stars or a number out of ten. In another example, video quality can subjectively be determined based on multiple user input. Multiple user input may be an average ranking, a cumulative ranking (e.g., users may increase or decrease a quality by one), and/or a combination of the above. In another implementation, video quality can be assessed automatically based on objective metrics (e.g., resolution, lighting quality, smoothness, frame transitions, color, author reputation).

Audio component quality associated with respective media items can vary. Audio component quality variation may be a result of several factors such as for example electronic equipment used in capturing audio, compression and decompression, orientation and distance from source audio, and/or background noise. In one aspect, audio component quality can be analyzed via audio quality evaluation techniques. For example, audio quality evaluation can be based on perceptual based audio quality methods (e.g., perceptual evaluation of audio quality (PEAQ), perceptual evaluation of speech quality (PESQ)), non-perceptual based audio quality methods (e.g., total harmonic distortion (THD), signal to noise ratio (SNR)), noise ratio (NR), spectral distortion (e.g., Bark spectral distortion), and/or comparison of parameters (e.g. loudness, amplitude modulation, adaption, masking parameters, linear distortion, bandwidth, and modular difference). In another example, at least one of psychoacoustic evaluation models or cognitive evaluation models can be employed to evaluate audio component quality.

In another example, analyzer component 130 can determine audio quality based on subjective user analysis. For example, one or more users can associate a quality to an audio aspect of a media item.

In an implementation, analyzer component 130 can employ pattern recognition techniques and/or systems to determine a rank associated with respective portions of a set of media items 114. The analyzer component 130 can determine a frequency rate of a pattern (e.g., how often a pattern appears) in each portion and/or segment of the plurality of media items 114. Analyzer component 130 can associate a higher rank with portions of the plurality of media items 114 with higher frequency rates.

In one example, analyzer component 130 can employ face/object recognition techniques on the portions to determine different people/objects. As another aspect, analyzer component 130 can employ clothing identification (e.g. by color) to boost people recognition rates. As another example, analyzer component 130 can employ composition/place detection techniques to cluster video frames by color moments (where 0 order moment would be the color histogram).

Further, analyzer component 130 can associate a rank with each portion and/or segment. A rank can be determined as a function of at least one analyzed metric. For example, analyzer component 130 can rank each portion and/or segment based on video composition (e.g., a higher rank is associated with media items of a desired composition). In another aspect, a plurality of metrics can be applied to determine rank. For example, analyzer component 130 can rank each media item based on a function of video composition, video quality and audio quality.

In one aspect, analyzer component 130 divides media items into a set of intervals. Respective temporally corresponding intervals of media items can be ranked. Sets of intervals related to the same source media item can be ranked as a function of an appropriate metric (e.g., video quality, audio quality, presence of a subject in video, composition of video, angle of video and/or audio) and grouped into segments. System 100 can record a rank and associate portion and/or segment in memory (e.g., as an array) for aggregation.

In one non-limiting exemplary implementation, analyzer component 130 can automatically and dynamically assign a rank to portions and/or group portions into segments with use of a dynamic Bayesian network such as a Hidden Markov Model (HMM) using a Viterbi algorithm. For example, a HMM can be configured for a face/person emphasis, scene/composition emphasis, and/or video/audio quality emphasis (e.g., resolution, sharpness, contrast, color saturation, audio noise) such that division into segments and ranking according to a metric occur simultaneously or substantially simultaneously. In an example, a HMM pairwise term depends on audio level (to prefer transition in quiet times) and on motion magnitude (to prefer transition during less action). In another aspect, local terms can depend on presence of some people/objects, video quality, audio quality, composition and the like.

In an implementation, analyzer component 130 can identify media content uploaded by members of a social circle or social network. The analyzer component 130 can make such identification using any suitable means such as for example, image recognition and/or accessing, as authorized, social networks, user published relationships, network connections, metadata, email or phone contacts, etc. Ranking of subsets of media content can be a function of relationship or association of sources of respective media content. Accordingly, the analyzer component can identify subsets of media content that are respectively generated by people that have a relationship or association (e.g., family, friends, co-workers, members of an organization, etc.), and who may desire to generate a composite media work that aggregates media content created by members of their social circle or network.

Aggregation component 140 transforms a set of media items into a new aggregated media item. Further, aggregation component 140 aggregates (e.g., stitches) a set of media items into a single seamless media item. In one aspect, aggregation component 140 stitches media items and/or segments of media items based on an associated rank to create a new media item. In another aspect, aggregated component 140 associates at least one media item with every moment of a common time line (e.g., a common timeline created by synchronization component 120) such that content from at least one media item is associated with each moment of playback.

In another implementation, given a HMM result, transitions can be removed to avoid a short segment. For example, a threshold time can be determined (e.g., 10 seconds). The given HMM result can yield portions or intervals grouped into segments whose associated segment lengths are smaller than the threshold. Segments with associated lengths small than the threshold can be eliminated such that the prior segment or subsequent segment can be assigned to the eliminated segments time slot. As another example, transitions between segments can be implemented by smooth transitions such as fade-out/in.

Figure 2:
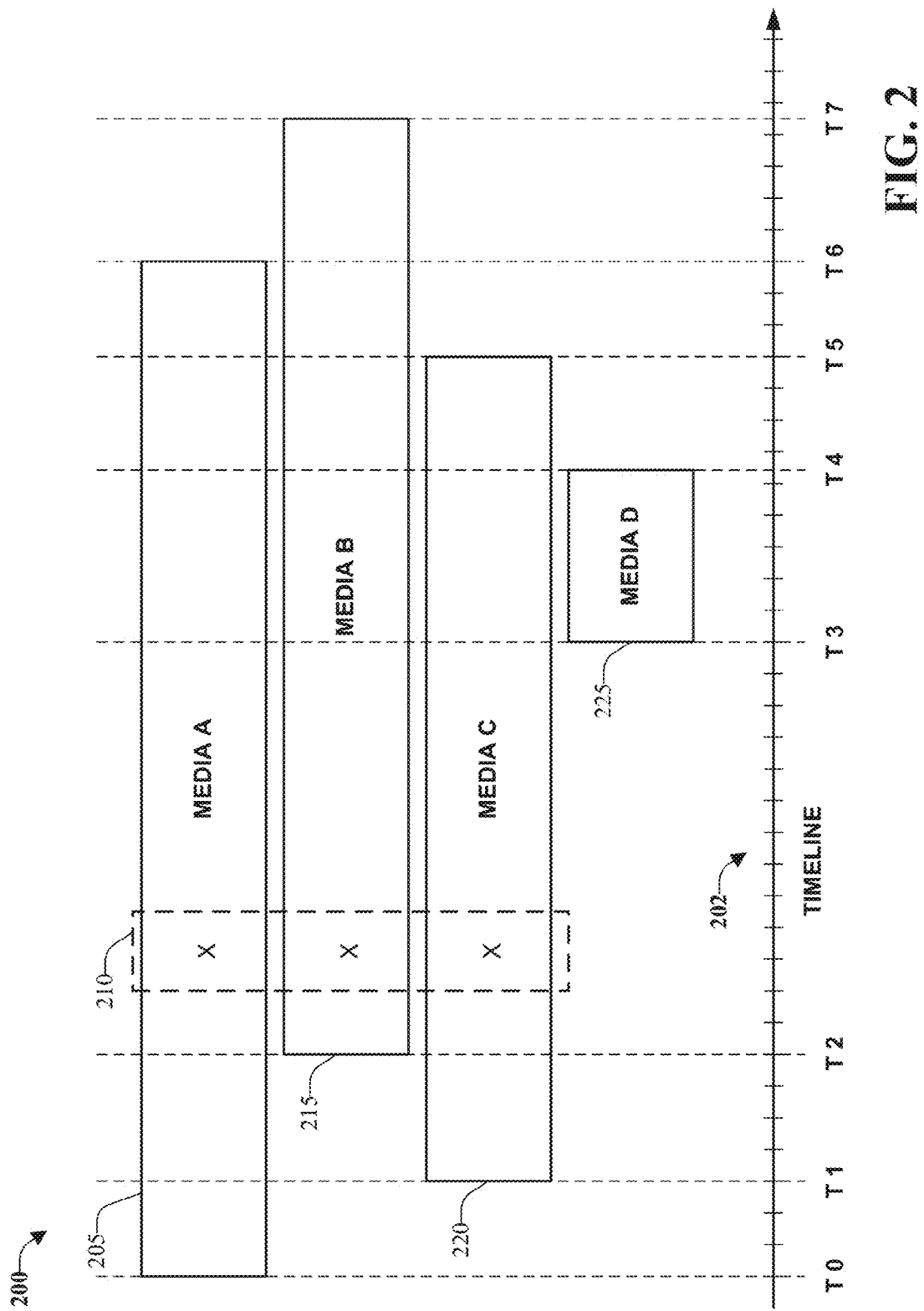
FIG. 2 illustrates an exemplary synchronization of media items in accordance with various aspects of this disclosure.

Turning to FIG. 2, with reference to FIG. 1, a graphical depiction 200 of media items synchronized on a common timeline 202 is provided. In FIG. 2, four different user captured video items (media items A, B, C, and D (205, 215, 220, 225)) are shown. The media items pertain to a common event. Each respective video item can be taken over same, different, or overlapping time periods. Each respective video item may be taken using different types of devices, e.g., different consumer electronic devices. For example, video items may be taken using a mobile phone by one user, a point-and-shoot digital camera by another user, and a different portable device by another user. While only four different media items are shown for illustrative purposes, a different number media items could be depicted instead.

In one example, identification component 110 creates a set of media items A, B, C, and D (205, 215, 220, 225) from a plurality of media items 114. The set of media items are associated to a common event (e.g., concert, play and/or sporting event).

Synchronization component 120 can identify the common feature(s) 210 of media items A, B and C (205, 215, 220). In one aspect, the common feature(s) may be recognized via image recognition, motion recognition, and/or audio recognition. Additional feature(s) can be identified between at least two media items of the set of media items A-D. In one aspect, synchronization component 120 can synchronize media items one or more times. In one example, media items A, B, C, and D (205, 215, 220, 225) may be synchronized according to identified key frames, frame by frame, randomly, and/or periodically.

In another implementation, synchronization component 120 defines an audio timeline by identifying common audio features of media items A, B, C, and D (205, 215, 220, 225). The common audio timeline may be used to synchronized audio and video playback and/or as a basis for audio aggregation.

Synchronization component 120 identifies or defines a common timeline 202. The common timeline 202 can have associated start and end times for each media item A, B, C, and D (205, 215, 220, 225). FIG. 2 depicts media items with the following time associations: media item A (205) begins at a time T0 and lasts until T6; media item B (215) begins at time T2 and lasts until T7; media item C (220) begins at T1 and lasts until T5; and media item D (225) begins at T3 and lasts until T4.

In an aspect, analyzer component 130 associates a rank with respective portions of the set of media items A, B, C, and D (205, 215, 220, 225).

Analyzer component 130 can temporally rank respective to portions as a function of a desired metric. For example, analyzer component 130 can rank respective portions of media item A (205) and C (220) associated with the period T1 to T2. In addition, analyzer component can rank respective to portions of media items A (205), B (215) and C (220) associated with period T2 to T3. In an implementation, analyzer component can store ranks of respective clips in an array.

Aggregation component 140 can aggregate the set of media items A, B, C, and D (205, 215, 220, 225) and/or respective portions and/or segments of media items, into one or more new aggregated media items as a function of rank. In one example, a media item and/or segment of a media item with a highest rank is selected for display for each respective moment on an associated timeline. In another example, highest ranked segments are stitched to create a seamless new aggregated media item. Stitching can refer to associating one portion and/or segment with a time interval of the common time line. The associated portions and/or segments can be transitioned for a seamless playback. The seamless aggregate media item is an ideal or substantially ideal media item with respect to desired metrics.

Figure 3:
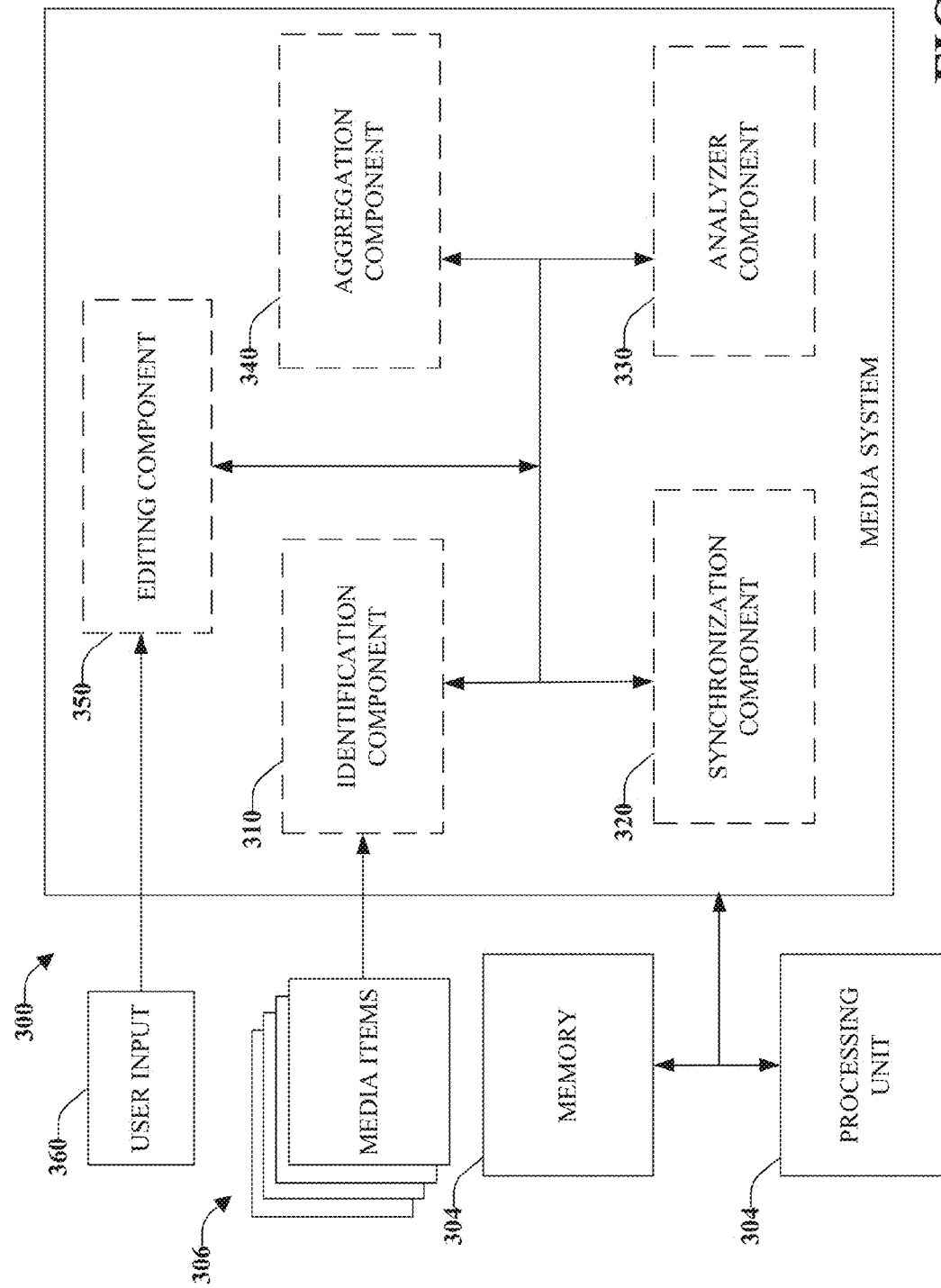
FIG. 3 illustrates a high-level functional block diagram of an example media system including an editing component in accordance with various aspects of this disclosure.

Referring to FIG. 3, there is illustrated a non-limiting exemplary implementation of media system 300 that provides media item aggregation according to an aspect of this disclosure. In use, a plurality of users uploads media items 306 to system 300. Media system 300 includes a computer processing unit 304 capable of executing various components stored in a computer readable medium (e.g., memory 306), such as an identification component 310, a synchronization component 320, an analyzer 330, an aggregation component 340, and an editing component 350. In one embodiment, memory 106 can also store the media item(s) 314. Identification component 310 collects media items 306 and associates media items of common events. Synchronization component 320 synchronizes media items with respect to time. Analyzer component 330 analyzes aspects of media item portions and ranks respective portions of media items. Aggregation component 340 aggregates the analyzed and synchronized media items into at least one new aggregated media item.

In one implementation, editing component 350 modifies analysis and ranking by analyzer component 330 and aggregation by aggregation component 340. In one example, user input 360 is received by editing component 350. Analyzer component 330 can place greater importance on a metric as a function of user input 360. In one example, editing component 350 receives user input 360 and ranks media items or segments of media items based entirely on user input. In certain implementations, basing ranking entirely on user input can eliminate and/or substantially reduce the need for analyzing media items.

In one example, editing component 350 can receive user input 360 from a set of users. For example, a user of the set of users can input one or more criteria and a different user of the set of users can input one or more additional criteria. Input from the set of users can place greater importance on a metric for analyzing. In another aspect, input from a set of users can associate a rank with media items (and/or portions of media items).

In another implementation, editing component 350 can apply rights associated with respective users to facilitate collecting user input. For example, rights associated with a user may be watch, edit, preview, and/or review past changes. In a collaborative environment, respective users' rights can dictate which users can edit, watch and/or review media items before, during or after an aggregation.

In one implementation, aggregation component 340 stitches media items and/or segments of media items to create a customized new media item as a function of user input 360 and/or appropriate metrics.

Figure 4:
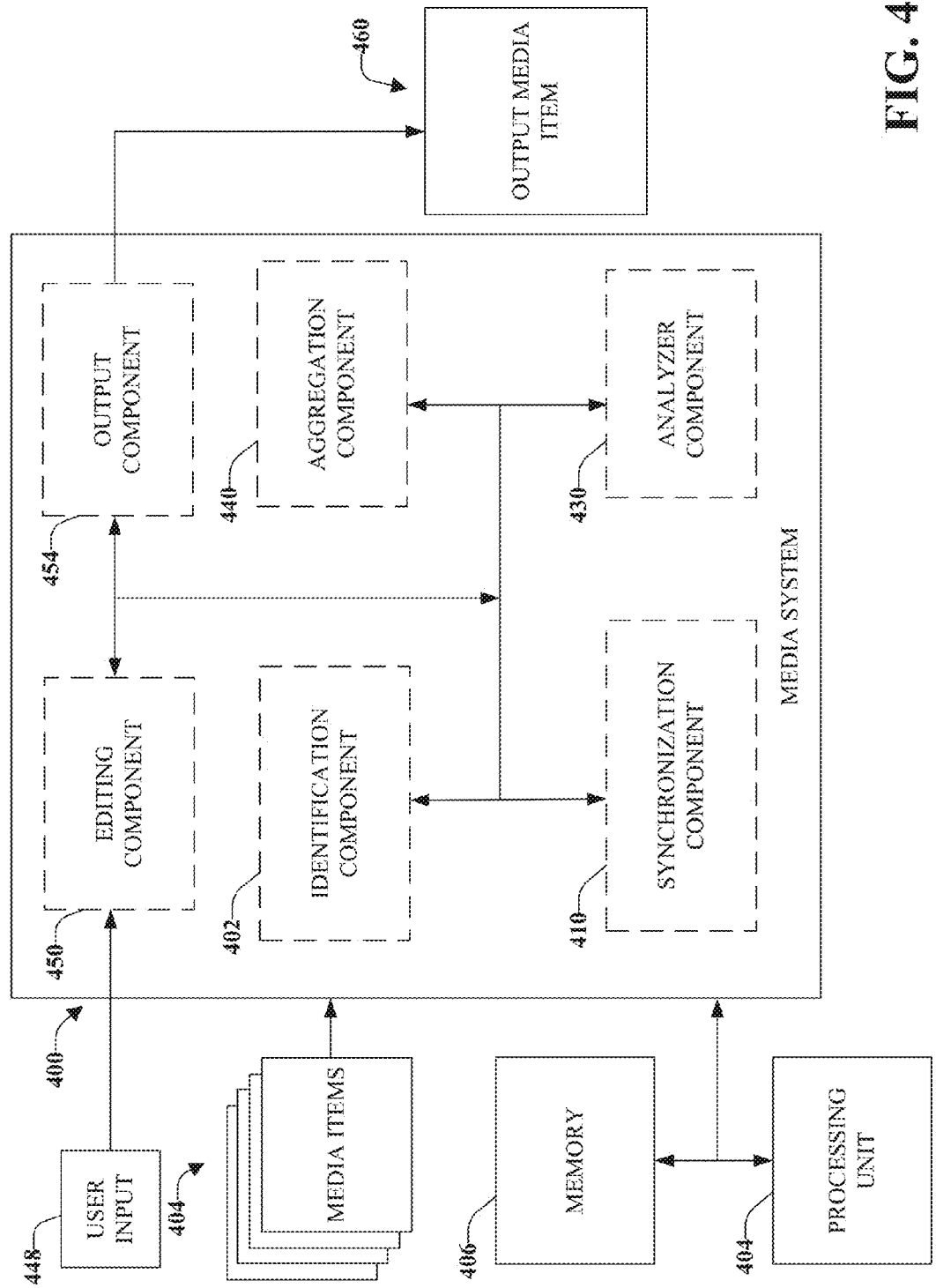
FIG. 4 illustrates a high-level functional block diagram of an example media system including an output component in accordance with various aspects of this disclosure.

Turning now to FIG. 4, there is illustrated a non-limiting exemplary implementation of a media system 400 that provides media aggregation, according to an aspect of this disclosure. Media system 400 includes a computer processing unit 404 capable of executing various components stored in a computer readable medium (e.g., memory 406), such as an identification component 402, a synchronization component 410, an analyzer 430, an aggregation component 440, a editing component 450, and an output component 454. In one embodiment, memory 106 can also store the media item(s) 414. Identification component 402 receives media items 404 and associate media items 404 into sets of media items pertaining to respective common events. Synchronization component 410 synchronizes media items with respect to time. Analyzer component 430 analyzes and ranks media or portions thereof according to at least one metric. Aggregation component 440 transforms a set of media items to at least one new media item.

In one implementation, editing component 450 modifies analysis and ranking by analyzer component 430 and aggregation by aggregation component 440. In one example, user input 448 is received by editing component 450. Analyzer component 430 can place greater importance on a metric as a function of user input 460. In one example, editing component 450 receives input and ranks media items or segments of media items based entirely on user input. In certain implementations, basing ranking entirely on user input can eliminate and/or substantially reduce the need for analyzing media items.

Output component 454 can publish the at least one new media item. In one aspect publishing the new media item can include saving the new media item in memory 406 and/or presenting (e.g., streaming, broadcasting, transmitting, downloading, and/or displaying) the published new media items by a server(s), and/or a client device(s). In one aspect, the at least one new media items cannot be edited. However in one implementation, a published new media item can be saved in memory 406 for further editing in a collaborative environment.

Figure 5:
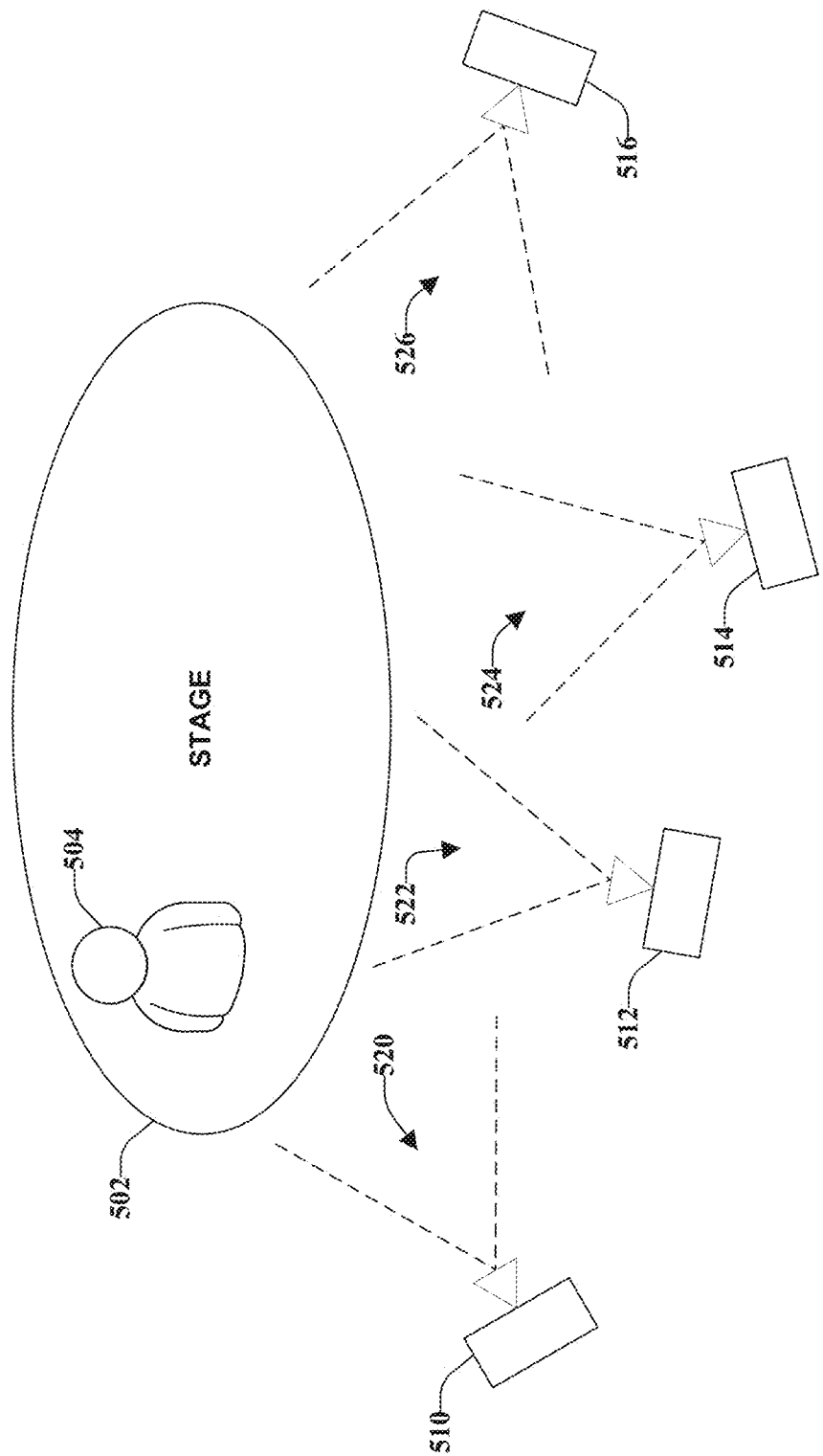
FIG. 5 illustrates an example diagram of a real world event in accordance with various aspects of this disclosure.

Referring now to FIG. 5 with reference to FIG. 4, there is illustrated a diagram of an event in accordance with various aspects of this disclosure. In FIG. 5, the event is a school concert where there is a stage 502 and a student performer 504 on the stage 502. A plurality of electronic devices (510, 512, 514, 516) captures media items of the event. Each media item captured by the electronic devices (510, 512, 514, 516) has an associated field of view (520, 522, 524, 526, respectively). In one example, media items captured by the plurality of electronic devices (510, 512, 514, 516) vary in audio quality, video quality, angle, and capture content (e.g., focus on different areas of stage 502). In use, each electronic capture device may be owned by a different user (e.g., a different parent of students in the school concert) and each user may upload the media item captured by his/her device to a user generated content (UCG) hosting site. In one implementation, an output component 454 provides for panning between fields of view of respective media items. For example, output component 454 may allow for output media information 460 to display the field of view 520 and can pan (e.g., according to user input received by editing component 450) to view 526 by transitioning to view 522, 524 and then 526.

Referring now to FIG. 6 with reference to FIG. 4, there is illustrated a diagram of captured media item frames in accordance with various aspects of this disclosure. In FIG. 6, there are various outputs of frames of four distinct media items. In one example, media item frame 610 represents a frame of a first media item with a complete view of a person, media item frame 620 represents a frame of a second media item with an obscured view of a person, media item frame 630 represents a frame of a third media item with a partial view of a person, and media item frame 640 represents a frame of a forth media item without a view of a person (e.g., capturing a different area of an event). In use, each media item can be captured from a device that may be owned by a different user (e.g., a different parent of students in a school concert) and each user may upload the media item captured by his/her device to a user generated content (UCG) hosting site. In one implementation, analyzer component 430 can automatically analyze and rank a media item frame (e.g., frame 610) as superior based on one or more metrics. In another aspect, editing component 450 can receive user input 448 to rank media item frames 610, 620, 630, and 640. While only four different media item frames are shown for illustrative purposes, a different number media items could be depicted instead. While media item frames are shown for illustrative purposes, media item segments or intervals could be depicted instead.

Figure 7:
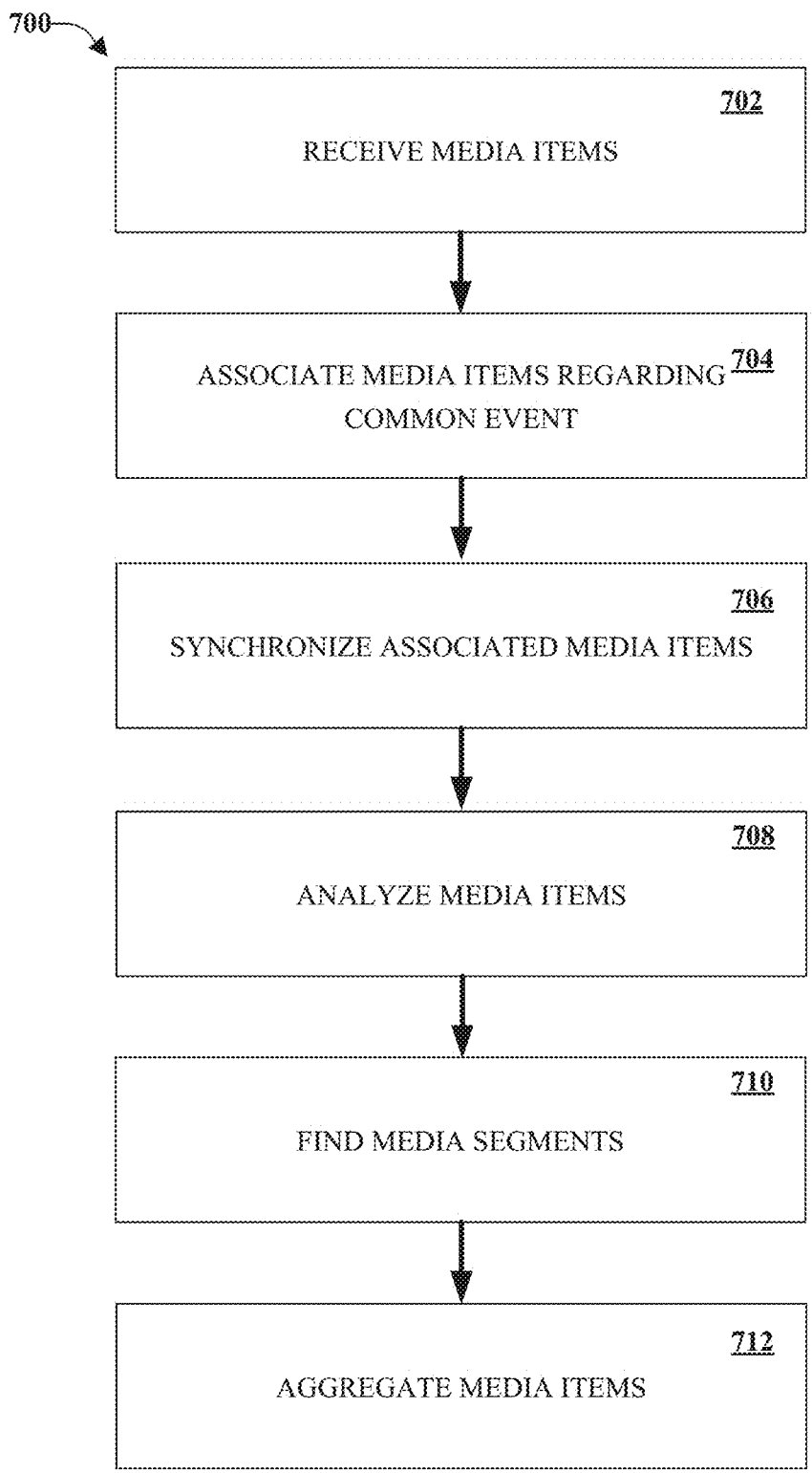
FIG. 7 illustrates an example methodology for aggregating media items in accordance with various aspects of this disclosure.
Figure 8:
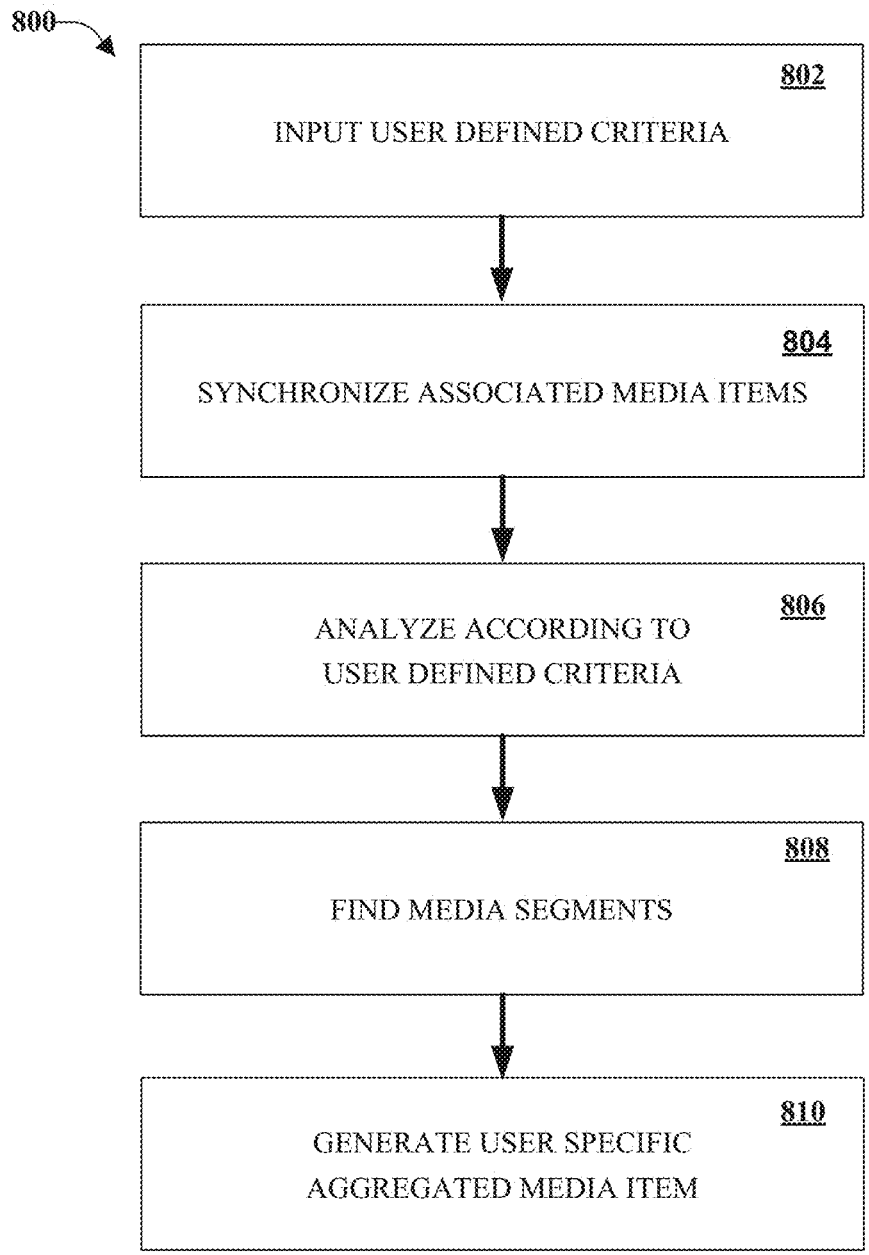
FIG. 8 illustrates an example methodology for aggregating media items according to user input in accordance with various aspects of this disclosure.
Figure 9:
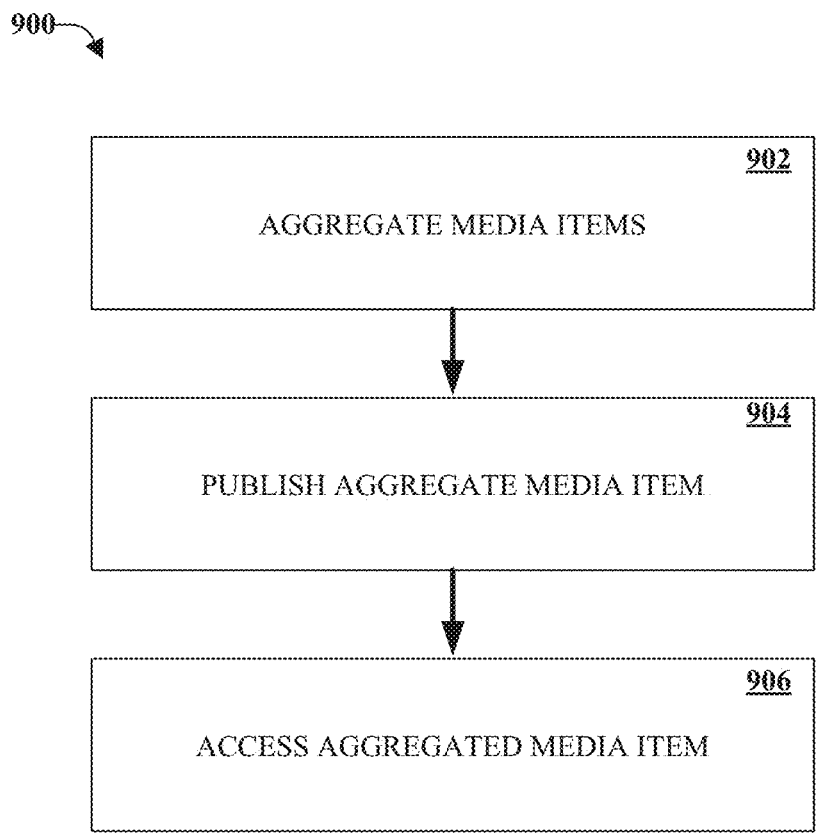
FIG. 9 illustrates an example methodology for aggregating media items and displaying media items in panoramic format in accordance with various aspects of this disclosure.

Referring now to FIGS. 7-9, there are illustrated methodologies and/or flow diagrams in accordance with the disclosed subject matter. For simplicity of explanation, the methodologies are depicted and described as a series of acts. However, acts in accordance with this disclosure can occur in various orders and/or concurrently, and with other acts not presented and described herein. Furthermore, not all illustrated acts may be required to implement the methodologies in accordance with the disclosed subject matter. In addition, those skilled in the art will understand and appreciate that the methodologies could alternatively be represented as a series of interrelated states via a state diagram or events. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer readable device or storage medium.

With reference to FIG. 7, there is illustrated a methodology 700 for aggregating media information, according to an aspect of this disclosure. As an example, various media applications, such as, but not limited to, media capturing systems, social networking systems, and UGC systems can use methodology 700. Specifically, methodology 700 transforms multiple media items into a single new aggregated media item.

An input component can receive a set of media items (e.g., by an input component) at 702. For example, a plurality of users can upload media items from a plurality of client devices (e.g., one or more smart phones, personal computers, tablet computers, and/or PDAs) to a server(s) and/or social video network(s) through a communication framework (e.g., internet, cellular network, satellite and/or ethernet) to an input component. In another aspect, the set of media items can be stored in a computer readable medium (e.g., volatile and/or nonvolatile memory).

At 704, a media system can associate media items. For example, the set of media items can be associated with a second set of media items pertaining to a common event (e.g., by an identification component).

Turning to 706, media items are synchronized (e.g., by a synchronization component). In one aspect, media items are synchronized with respect to time. Synchronization may be based on identifiable aspects of media information such as common audio or video characteristics. In one example, synchronization is based, at least in part, on metadata such as time stamps.

At 708, media items are analyzed (e.g., by an analyzing component). Analyzing media items may include analyzing respective portions according to appropriate metrics such as audio/video quality, presence of a subject in video, composition of video, angle of video and/or division of media items into appropriate segments.

At 710, media item portions can be ranked and grouped into media item segments (e.g., by an analyzing component) and an appropriate segment can be found). For example, an analyzer component can find the appropriate media item segment (e.g., find the media item segment which is to be aggregated). Ranking can comprise associating a unique rank with each portion and/or segment as a function of an analyzed metric(s) and/or a feature(s). In one aspect, temporally respective media item segments are ranked with each other.

Turning to 712, media items are transformed into one or more new aggregated media item (e.g., by an aggregation component). The new aggregated media item can comprise multiple media items respective portions and/or segments stitched together to create a seamless and optimal (or nearly optimal) media item. In another aspect, transitions between media item segments are applied to smooth playback.

Referring to FIG. 8 there illustrated is a methodology 800 for user specific media item aggregation, according to an aspect of this disclosure. As an example, methodology 800 can be utilized in various web applications, media capturing systems, media displaying systems, computing devices, cellular phones, etc. Specifically, methodology 800 enables utilization of user defined criteria to provide for aggregate media files of a common event which most interest a user.

Initially, media items can be captured or can be contained within a memory (e.g., memory 306). At 802, a user can define criteria for aggregation (e.g., via input collected by an editing component). Criteria for aggregation can be related to identifiable characteristics of media items such as frequency of a visual pattern in frames (e.g., a face, object, and/or other pattern), video quality, audio quality, image characteristics, video characteristics (motion, brightness, color), and/or sound characteristics (e.g., bass, treble, noise), for example.

At 804, a set of media items is synchronized with respect to time (e.g., by a synchronization component). At 806, media items and/or portions of media items can be analyzed according to the user defined criteria (e.g., by an analyzing component utilizing user input). For example, media items can be divided into portions (e.g., frames and/or intervals) and the portions can be analyzed.

At 808, the set of media item portions can be ranked according to the user defined criteria (e.g., by an analyzing component). In another aspect, the media item portions of the set of media item portions are grouped into segments (e.g., by an analyzing component). The appropriate media item segment for a time period can be found or determined based on analyzed metrics. For example, a user may select video quality as the most important attribute for ranking Thus, media item portions with higher associated video quality will have a higher rank. In another example, a set of users can provide respective input to access a set of media items (e.g., view, edit, preview and/or review an aggregation project). In one aspect, the set of users can save changes made to a set of media items and/or associated ranking. The saved changes are available for future editing of the set of media items and/or associated ranking.

At 810 sets of media item portions and/or segments are transformed into one or more new aggregated media items (e.g., by an aggregation component). In one aspect, the new aggregated media item contains portions and/or segments of a plurality of media item of the set of media items. In another aspect, media items are aggregated at a time based on a user(s) input.

FIG. 9 illustrates an example methodology 900 for media item aggregation and display in accordance with an aspect of this disclosure. Initially a plurality of media items are analyzed (e.g., by an analyzer component), synchronized (e.g., by a synchronization component), and ranked (e.g., by an analyzer component). At 902, an aggregation component, for example, can aggregate media items with respect to a rank into a new media item. In another example, media items can be aggregated with respect to an associated field of view as compared to other media items to generate a new media item.

At 904, a new media item is published (e.g., by an output component). Publishing the new media items can include saving in a computer readable memory or streaming, downloading, broadcasting and/or displaying the new media item (e.g., by an output component). For example, displaying media items can be accomplished via electronic devices such as smart phones, tablets, hand held computers, and desk top computers.

At 906, the publishing new media item(s) can be accessed. Accessing the new memory can include streaming, downloading, broadcasting and/or displaying the new media item. In another aspect, accessing the published new media item(s) can include editing the ranking, aggregation, and analyzing (e.g., using a editing component).

The systems and processes described below can be embodied within hardware, such as a single integrated circuit (IC) chip, multiple ICs, an application specific integrated circuit (ASIC), or the like. Further, the rank in which some or all of the process blocks appear in each process should not be deemed limiting. Rather, it should be understood that some of the process blocks can be executed in a variety of orders that are not all of which may be explicitly illustrated herein.

Figure 10:
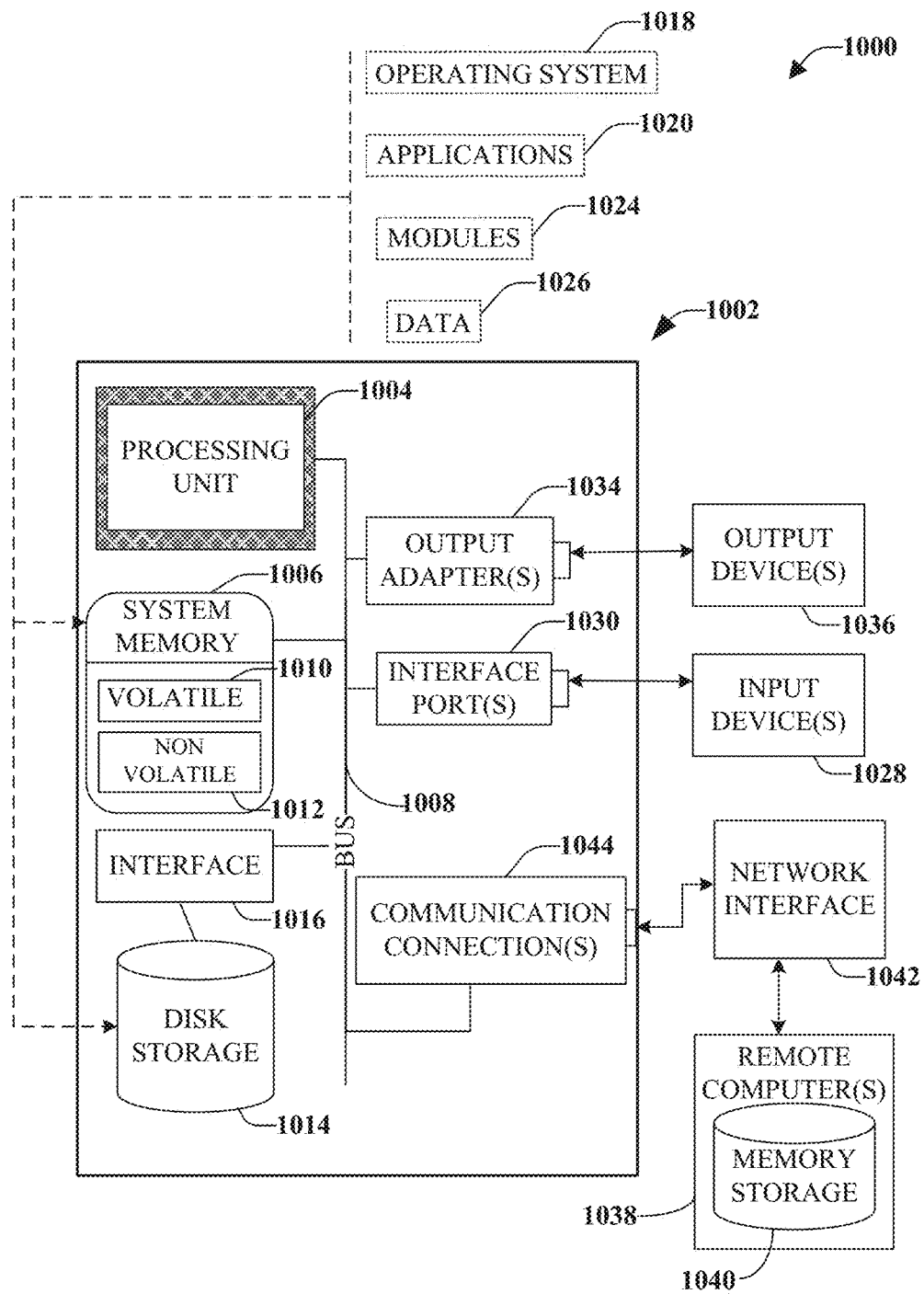
FIG. 10 illustrates an example schematic block diagram of a computing environment in accordance various aspects of this disclosure.

With reference to FIG. 10, a suitable environment 1000 for implementing various aspects of the claimed subject matter includes a computer 1002. The computer 1002 includes a processing unit 1004, a system memory 1006, a codec 1005, and a system bus 1008. The system bus 1008 couples system components including, but not limited to, the system memory 1006 to the processing unit 1004. The processing unit 1004 can be any of various available processors. Dual microprocessors and other multiprocessor architectures also can be employed as the processing unit 1004.

The system bus 1008 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCM-CIA), Firewire (IEEE 1394), and Small Computer Systems Interface (SCSI).

The system memory 1006 includes volatile memory 1010 and non-volatile memory 1012. The basic input/output system (BIOS), containing the basic routines to transfer information between elements within the computer 1002, such as during start-up, is stored in non-volatile memory 1012. By way of illustration, and not limitation, non-volatile memory 1012 can include read only memory (ROM), programmable ROM (PROM), electrically programmable ROM (EPROM), electrically erasable programmable ROM (EEPROM), or flash memory. Volatile memory 1010 includes random access memory (RAM), which acts as external cache memory. According to present aspects, the volatile memory may store the write operation retry logic (not shown in FIG. 10) and the like. By way of illustration and not limitation, RAM is available in many forms such as static RAM (SRAM), dynamic RAM (DRAM), synchronous DRAM (SDRAM), double data rate SDRAM (DDR SDRAM), and enhanced SDRAM (ESDRAM).

Computer 1002 may also include removable/non-removable, volatile/non-volatile computer storage media. FIG. 10 illustrates, for example, a disk storage 1014. Disk storage 1014 includes, but is not limited to, devices like a magnetic disk drive, solid state disk (SSD) floppy disk drive, tape drive, Zip drive, LS-100 drive, flash memory card, or memory stick. In addition, disk storage 1014 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1014 to the system bus 1008, a removable or non-removable interface is typically used, such as interface 1016.

It is to be appreciated that FIG. 10 describes software, software in execution, hardware, and/or software in combination with hardware that acts as an intermediary between users and the basic computer resources described in the suitable operating environment 1000. Such software includes an operating system 1018. Operating system 1018, which can be stored on disk storage 1014, acts to control and allocate resources of the computer system 1002. Applications 1020 take advantage of the management of resources by operating system 1018 through program modules 1024, and program data 1026, such as the boot/shutdown transaction table and the like, stored either in system memory 1006 or on disk storage 1014. It is to be appreciated that the claimed subject matter can be implemented with various operating systems or combinations of operating systems. For example, applications 1020 and program data 1026 can include software implementing aspects of this disclosure.

A user enters commands or information into the computer 1002 through input device(s) 1028. Input devices 1028 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1004 through the system bus 1008 via interface port(s) 1030. Interface port(s) 1030 include, for example, a serial port, a parallel port, a game port, and a universal serial bus (USB). Output device(s) 1036 use some of the same type of ports as input device(s) 1028. Thus, for example, a USB port may be used to provide input to computer 1002, and to output information from computer 1002 to an output device 1036. Output adapter 1034 is provided to illustrate that there are some output devices 1036 like monitors, speakers, and printers, among other output devices 1036, which require special adapters. The output adapters 1034 include, by way of illustration and not limitation, video and sound cards that provide a means of connection between the output device 1036 and the system bus 1008. It should be noted that other devices and/or systems of devices provide both input and output capabilities such as remote computer(s) 1038.

Computer 1002 can operate in a networked environment using logical connections to one or more remote computers, such as remote computer(s) 1038. The remote computer(s) 1038 can be a personal computer, a server, a router, a network PC, a workstation, a microprocessor based appliance, a peer device, a smart phone, a tablet, or other network node, and typically includes many of the elements described relative to computer 1002. For purposes of brevity, only a memory storage device 1040 is illustrated with remote computer(s) 1038. Remote computer(s) 1038 is logically connected to computer 1002 through a network interface 1042 and then connected via communication connection(s) 1044. Network interface 1042 encompasses wire and/or wireless communication networks such as local-area networks (LAN), wide-area networks (WAN), and cellular networks. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1044 refers to the hardware/software employed to connect the network interface 1042 to the bus 1008. While communication connection 1044 is shown for illustrative clarity inside computer 1002, it can also be external to computer 1002. The hardware/software necessary for connection to the network interface 1042 includes, for exemplary purposes only, internal and external technologies such as, modems including regular telephone grade modems, cable modems and DSL modems, ISDN adapters, wired and wireless Ethernet cards, hubs, and routers.

Figure 11:
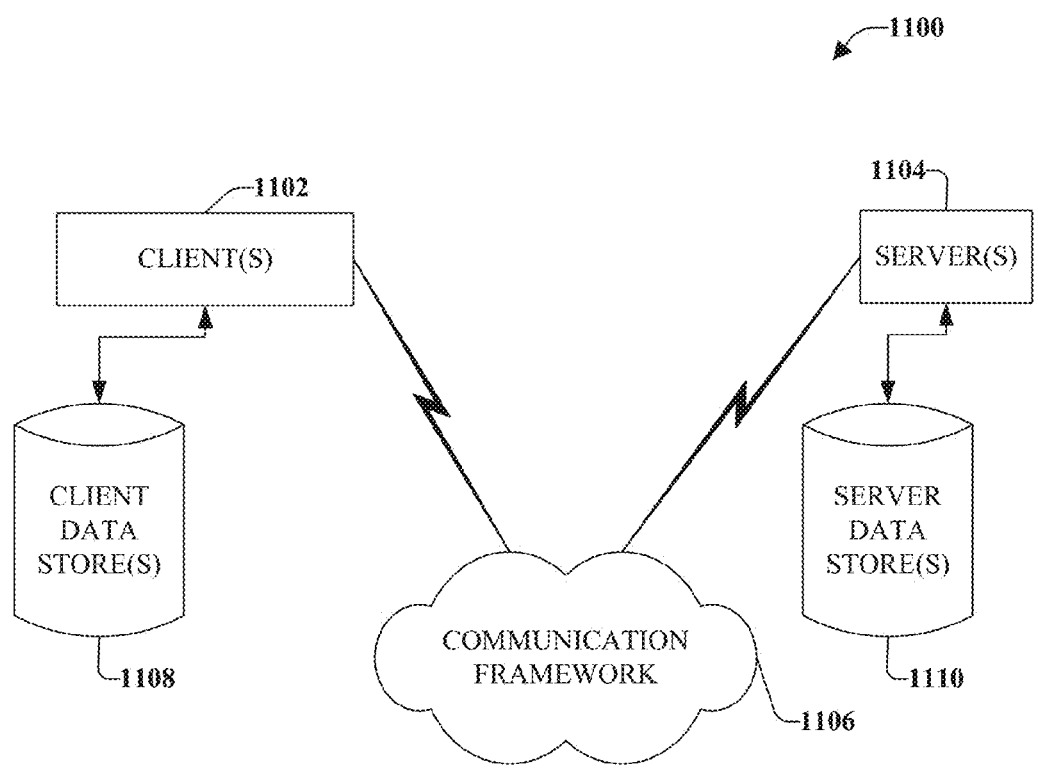
FIG. 11 illustrates an example block diagram of a computer operable to execute various aspects of this disclosure.

Referring now to FIG. 11, there is illustrated a schematic block diagram of a computing environment 1100 in accordance with this specification. The system 1100 includes one or more client(s) 1102, (e.g., computers, smart phones, tablets, cameras, PDA's). The client(s) 1102 can be hardware and/or software (e.g., threads, processes, computing devices). The client(s) 1102 can house cookie(s) and/or associated contextual information by employing the specification, for example.

The system 1100 also includes one or more server(s) 1104. The server(s) 1104 can also be hardware or hardware in combination with software (e.g., threads, processes, computing devices). The servers 1104 can house threads to perform transformations by employing aspects of this disclosure, for example. One possible communication between a client 1102 and a server 1104 can be in the form of a data packet adapted to be transmitted between two or more computer processes wherein data packets may include coded media items and/or aggregated media items. The data packet can include a cookie and/or associated contextual information, for example. The system 1100 includes a communication framework 1106 (e.g., a global communication network such as the Internet) that can be employed to facilitate communications between the client(s) 1102 and the server(s) 1104.

Communications can be facilitated via a wired (including optical fiber) and/or wireless technology. The client(s) 1102 are operatively connected to one or more client data store(s) 1108 that can be employed to store information local to the client(s) 1102 (e.g., cookie(s) and/or associated contextual information). Similarly, the server(s) 1104 are operatively connected to one or more server data store(s) 1110 that can be employed to store information local to the servers 1104.

In one implementation, a client 1102 can transfer an encoded file, (e.g., encoded media item), to server 1104. Server 1104 can store the file, decode the file, or transmit the file to another client 1102. It is to be appreciated, that a client 1102 can also transfer uncompressed file to a server 1104 and server 1104 can compress the file in accordance with the disclosed subject matter. Likewise, server 1104 can encode video information and transmit the information via communication framework 1106 to one or more clients 1102.

The illustrated aspects of the disclosure may also be practiced in distributed computing environments where certain tasks are performed by remote processing devices that are linked through a communications network. In a distributed computing environment, program modules can be located in both local and remote memory storage devices.

Moreover, it is to be appreciated that various components described herein can include electrical circuit(s) that can include components and circuitry elements of suitable value in order to implement the implementations of this innovation(s). Furthermore, it can be appreciated that many of the various components can be implemented on one or more integrated circuit (IC) chips. For example, in one implementation, a set of components can be implemented in a single IC chip. In other implementations, one or more of respective components are fabricated or implemented on separate IC chips.

What has been described above includes examples of the implementations of the present invention. It is, of course, not possible to describe every conceivable combination of components or methodologies for purposes of describing the claimed subject matter, but it is to be appreciated that many further combinations and permutations of this innovation are possible. Accordingly, the claimed subject matter is intended to embrace all such alterations, modifications, and variations that fall within the spirit and scope of the appended claims. Moreover, the above description of illustrated implementations of this disclosure, including what is described in the Abstract, is not intended to be exhaustive or to limit the disclosed implementations to the precise forms disclosed. While specific implementations and examples are described herein for illustrative purposes, various modifications are possible that are considered within the scope of such implementations and examples, as those skilled in the relevant art can recognize.

In particular and in regard to the various functions performed by the above described components, devices, circuits, systems and the like, the terms used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter. In this regard, it will also be recognized that the innovation includes a system as well as a computer-readable storage medium having computer-executable instructions for performing the acts and/or events of the various methods of the claimed subject matter.

The aforementioned systems/circuits/modules have been described with respect to interaction between several components/blocks. It can be appreciated that such systems/circuits and components/blocks can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but known by those of skill in the art.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. For example, a range of "less than or equal to 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 5. In certain cases, the numerical values as stated for the parameter can take on negative values.

In addition, while a particular feature of this innovation may have been disclosed with respect to only one of several implementations, such feature may be combined with one or more other features of the other implementations as may be desired and advantageous for any given or particular application. Furthermore, to the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

Reference throughout this specification to "one implementation" or "an implementation" or "one embodiment" or "an embodiment" means that a particular feature, structure, or characteristic described in connection with the implementation is included in at least one implementation or at least one embodiment. Thus, the appearances of the phrase "in one implementation" or "in an implementation" or "in one embodiment" or "in an embodiment" in various places throughout this specification are not necessarily all referring to the same implementation/embodiment. Furthermore, the particular features, structures, or characteristics may be combined in any suitable manner in one or more implementations/embodiments.

Further, references throughout this specification to an "item," or "file," means that a particular structure, feature or object described in connection with the implementations are not necessarily referring to the same object. Furthermore, a "file" or "item" can refer to an object of various formats. While referees to media items generally refer to video items (a series of image files with or without audio), it is to be appreciated that media items may be of various formats.

As used in this application, the terms "component," "module," "system," or the like are generally intended to refer to a computer-related entity, either hardware (e.g., a circuit), a combination of hardware and software, or an entity related to an operational machine with one or more specific functionalities. For example, a component may be, but is not limited to being, a process running on a processor (e.g., digital signal processor), a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers. While separate components are depicted in various implementations, it is to be appreciated that the components may be represented in one or more common component. Further, design of the various implementations can include different component placements, component selections, etc., to achieve an optimal performance. Further, a "device" can come in the form of specially designed hardware; generalized hardware made specialized by the execution of software thereon that enables the hardware to perform specific function (e.g., media item aggregation); software stored on a computer readable medium; or a combination thereof.

Moreover, the words "example" or "exemplary" are used herein to mean serving as an example, instance, or illustration. Any aspect or design described herein as "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

What is claimed is:

1. A system, comprising:
   a non-transitory computer readable medium encoded with computer executable components;
   a processor that executes the following computer executable components encoded in the non-transitory computer readable medium:
      an identification component that automatically identifies a subset of media items, among a set of media items, wherein the subset of media items comprise at least two media items comprising respective recordings from distinct recording devices at a common event;
      a synchronization component that:
         identifies at least one of audio or video characteristics of the subset of media items indicative of respective points in time on a common timeline;
         synchronizes the subset of media items based upon the at least one of audio or video characteristics onto the common timeline into a set of synchronized media items;
      an analyzer component that analyzes segments of media items of the set of synchronized media items and ranks the segments in each of a plurality of time periods of the common timeline according to a criteria; and
      an aggregation component that aggregates a highest ranked segment from each time period to generate a new media item.

2. The system of claim 1, wherein the analyzer component assigns an audio rank and a video rank to each segment; and the aggregation component aggregates video from a highest video ranked segment from each time period to generate the new media item and aggregates audio from a highest audio ranked segment from each time period to generate the new media item.

3. The system of claim 1, wherein the criteria comprises frequency of appearance of a particular person in a media item.

4. The system of claim 1, wherein the video characteristic comprises recognized motion within video of a media item.

5. The system of claim 2, wherein the aggregation component aggregates the segments by stitching the segments together according to the common timeline.

6. The system of claim 1, wherein the at least one of audio or video characteristics comprises at least one of video composition, identified visual pattern, motion recognition, audio recognition, video quality, or audio quality.

7. The system of claim 1, wherein the criteria comprises frequency of appearance of a particular object in a media item.

8. The system of claim 1, wherein the criteria comprises a function of respective relationships of creators of the media items.

9. A method, comprising:
   receiving, by system including a processor, a plurality of media items;
   identifying, by the system, a set of media items, among the plurality of media items, wherein the set of media items comprise at least two media items comprising respective recordings from distinct recording devices at a common event;
   identifying, by the system, at least one of audio or video characteristics of the set of media items indicative of respective points in time on a common timeline;

synchronizing, by the system, the set of media items based upon the at least one of audio or video characteristics onto the common timeline;

ranking, by the system, segments of media items of the set of media items in each of a plurality of time periods of the common timeline according to at least one attribute;

aggregating, by the system, a highest ranked segment from each time period into a new media item.

10. The method of claim 9, wherein the ranking comprises assigning an audio rank and a video rank to each segment, and the aggregating comprises aggregating video from a highest video ranked segment from each time period to generate the new media item and aggregating audio from a highest audio ranked segment from each time period to generate the new media item.

11. The method of claim 9, wherein the at least one attribute comprises frequency of appearance of a particular person in a media item.

12. The method of claim 10, wherein the at least one attribute comprises at least one of angle of video source, video quality, detected visual pattern, or audio quality.

13. The method of claim 10, wherein the video characteristic comprises recognized motion within video of a media item.

14. The method of claim 10, wherein the at least one attribute comprises frequency of appearance of a particular object in a media item.

15. The method of claim 10, wherein the at least one attribute comprises a function of respective relationships of creators of the media items.

16. A non-transitory computer-readable medium having instructions stored thereon that, in response to execution, cause a system including a processor to perform operations comprising:

receiving a plurality of media items;

identifying a set of media items, among the plurality of media items, wherein the set of media items comprise at least two media items comprising respective recordings from distinct recording devices at a common event;

identifying at least one of audio or video characteristics of the set of media items indicative of respective points in time on a common timeline;

synchronizing the set of media items based upon the at least one of audio or video characteristics onto the common timeline;

ranking segments of media items of the set of media items in each of a plurality of time periods of the common timeline according to at least one metric;

aggregating a highest ranked segment from each time period to generate a new media item.

17. The non-transitory computer-readable medium of claim 16, wherein the ranking comprises assigning an audio rank and a video rank to each segment, and the aggregating comprises aggregating video from a highest video ranked segment from each time period to generate the new media item and aggregating audio from a highest audio ranked segment from each time period to generate the new media item.

18. The non-transitory computer-readable medium of claim 16, wherein the at least one metric comprises frequency of appearance of a particular person in a media item.

19. The non-transitory computer-readable medium of claim 16, wherein the video characteristic comprises recognized motion within video of a media item.

20. The non-transitory computer-readable medium of claim 16, wherein the at least one metric comprises a function of respective relationships of creators of the media items.

* * * * *